United States Patent

[11] 3,584,562

[72] Inventor Kenneth R. Wisner
 263-A W. 12th St., New York, N.Y. 10014
[21] Appl. No. 757,394
[22] Filed Sept. 4, 1968
[45] Patented June 15, 1971

[54] PHOTOGRAPHIC FILM HOLDER
 6 Claims, 7 Drawing Figs.

[52] U.S. Cl. ..................................................... 95/71,
 95/13, 95/19
[51] Int. Cl. ..................................................... G03b 17/26
[50] Field of Search ......................................... 95/13, 11,
 19, 72

[56] References Cited
UNITED STATES PATENTS

| | | | |
|---|---|---|---|
| 2,609,739 | 9/1952 | Tatro | 95/34 |
| 2,656,771 | 10/1953 | Hasselblad | 95/19 X |
| 2,740,338 | 4/1956 | Bing et al. | 95/11 |
| 2,800,843 | 7/1957 | Melita | 95/31 |
| 2,911,894 | 11/1959 | Hennig et al. | 95/11 |
| 2,931,281 | 4/1960 | Dalton | 95/72 X |
| 3,266,396 | 8/1966 | Padelt | 95/11 |
| 3,359,877 | 12/1967 | Kitrosser | 95/19 X |

OTHER REFERENCES

"The Hasselblad Idea," JOURNAL OF THE PHOTOGRAPHIC SOCIETY OF AMERICA, July 1958, page 12.

Primary Examiner—Samuel S. Matthews
Assistant Examiner—Robert P. Greiner
Attorney—Yuter and Fields ABSTRACT: An accessory camera back for converting a conventional film type camera having a removable back to a camera which is adapted to take Polaroid pictures. An enclosed housing having a hinged top wall is provided which is adapted to receive a Polaroid pack of film therein. A through light aperture is received in the top plate to provide for the passage of light into the interior of the housing to expose the film. A removable dark slide is slidably received in said housing for closing the light aperture. A plurality of projection receiving openings are provided in the top wall which are adapted to receive projections from a camera body to mount the housing on the camera. Additionally, locking means are provided to engage the projections to lock the camera back to the camera.

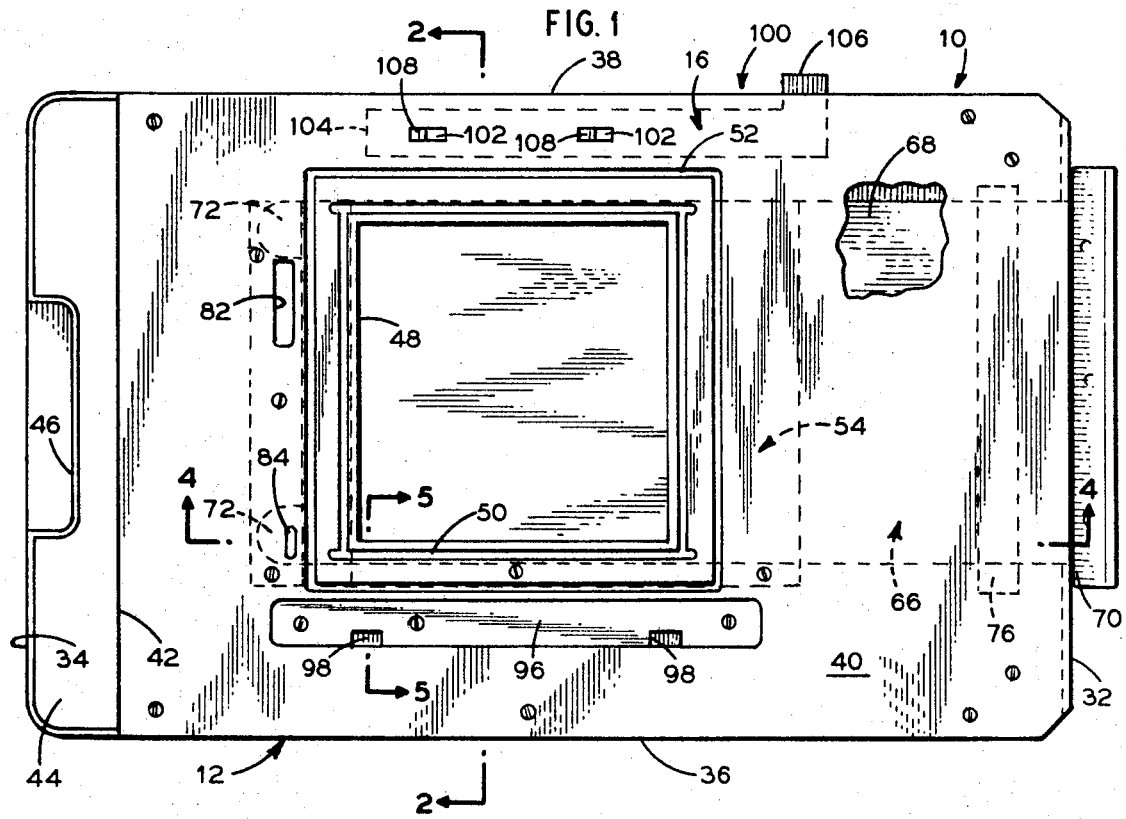
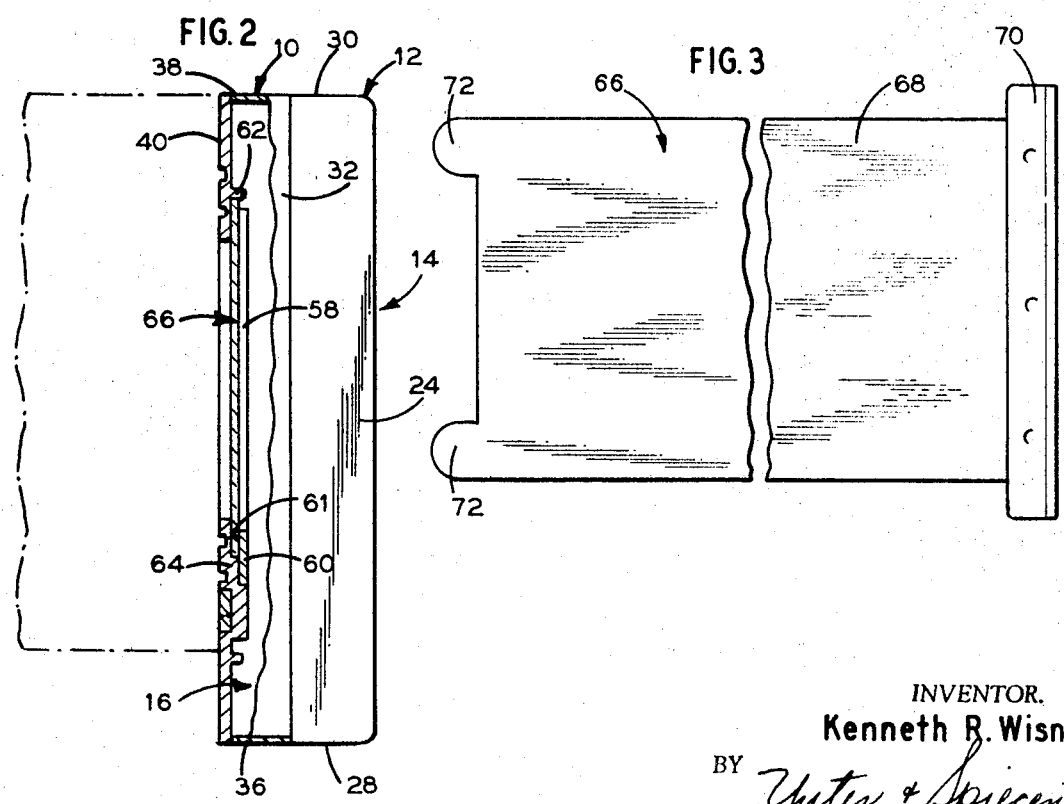

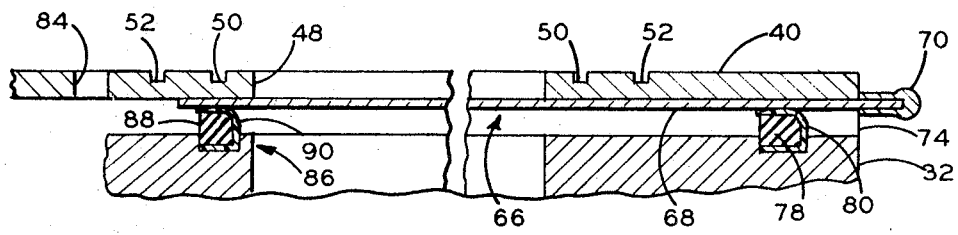
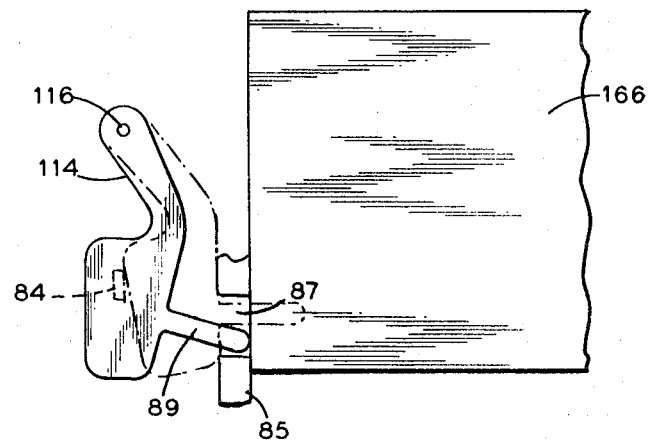
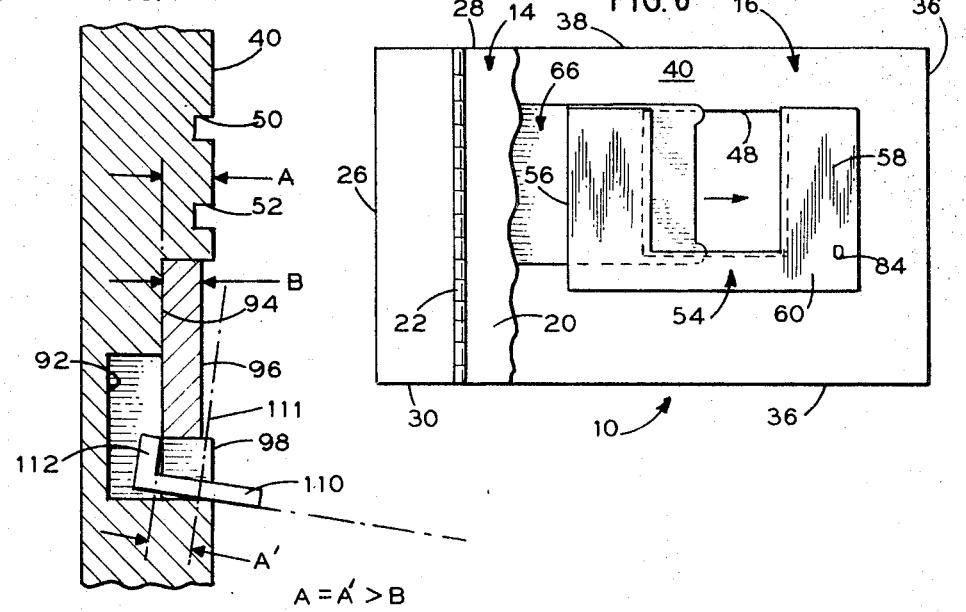

PHOTOGRAPHIC FILM HOLDER

This invention relates generally to a camera accessory and, more particularly, pertains to a device for converting a conventional roll or pack film-type camera to one which is adapted to take Polaroid pictures.

Many photographers make use of a Polaroid camera prior to taking a picture with a conventional pack or roll film-type camera so that they can examine the lighting arrangement, the color arrangement, the position and composition of the objects, the depth of field, etc., all in a matter of a minute. Additionally, the Polaroid camera allows the serious or professional photographer to perfect and develop special effects in a relatively short interval of time as compared with the amount of time required by conventional film-type cameras. All the above may be accomplished quickly and easily because a Polaroid camera utilizing Polaroid film produces a picture in less than a minute after the shutter is operated. However, a drawback associated with the above is that a separate Polaroid camera is required to take advantage of the features of Polaroid film.

In order to provide a reasonably economic solution to the problem, many accessories have been provided for conventional film cameras which adapt the camera so that Polaroid pictures may be taken therewith. More specifically, camera backs have been designed which are adapted to be connected to conventional roll or pack film cameras of the type having a removable back. Polaroid-type film may be placed in these accessory backs so that the particular camera is adapted to provide Polaroid pictures. However, there are many disadvantages associated with presently available accessory camera backs of the type under consideration.

To be more specific, it has been found that some of these accessory Polaroid backs allegedly designed for a particular camera interfere with the operation of the mechanism of the camera which may result in permanent damage to the camera's operations, thereby requiring expensive repairs of the delicate mechanism. Moreover, some of these backs are provided with a film dispensing slot which requires film to be removed from the left. This is an extremely inconvenient procedure for the photographer, since almost all Polaroid cameras are designed to allow film to be drawn from the right side of the camera. Additionally, it has been found that the light traps are inadequate in presently manufactured Polaroid film adapter camera backs and, as a result, portions of the pictures may be found to be fogged.

Accordingly, an object of the present invention is to provide an improved accessory back for a conventional roll or pack film-type camera which adapts the camera to take Polaroid pictures.

A more specific object is to provide an accessory camera back for taking Polaroid pictures which does not interfere with the operation of the camera mechanism.

Another object of the invention is to provide an accessory camera back for taking Polaroid pictures which includes efficient light blocking systems to prevent stray light from striking the film thereby eliminating the possibility of fogging.

A further object and feature of the present invention resides in the novel details of construction which provide an accessory camera back of the type described, which includes a dark slide which may be inserted into the back, regardless of the orientation of the slide.

Another object of the invention is the provision of an accessory camera back to adapt a camera to take Polaroid pictures, wherein the film is removed from the right side of the camera.

A camera back constructed in accordance with the present invention includes an enclosed housing having means for receiving a pack of Polaroid film. The housing includes a top plate or wall which is hingedly connected to the remainder of the housing so that the housing may be opened to insert or remove a pack of Polaroid film. A through light aperture is provided in the top plate to provide for the passage of light into the interior of the housing to expose the film therein, and a removable dark slide is slidably received in the housing to close the light aperture to prevent the passage of light into the interior. A plurality of lug-receiving apertures are provided in the top plate for receiving projecting lugs from a camera body to mount the housing on the camera body thereby to provide a camera accessory which adapts the camera to take Polaroid pictures.

Other advantages and features of the present invention will become more apparent from a consideration of the following detailed description when taken in conjunction with the accompanying drawings, in which:

FIG. 1 is a top plan view of a camera back constructed in accordance with the present invention;

FIG. 2 is a partial sectional view taken along the line 2-2 of FIG. 1;

FIG. 3 is a top plan view of the dark slide of the camera back;

FIG. 4 is a sectional view, with parts broken away and to an enlarged scale, taken along the line 4-4 of FIG. 1;

FIG. 5 is a detailed view, in section and to an enlarged scale, illustrating how a camera is initially connected to the camera back shown in FIG. 1;

FIG. 6 is a rear elevational view, with parts broken away and to a reduced scale, of the device shown in FIG. 1, and with the dark slide partially inserted; and FIG. 7 is a modified embodiment of a light trap which may be used in the camera accessory of the present invention.

In the description which follows, the camera accessory back of the present invention will be described in conjunction with a conventional roll-type film camera manufactured by the Hasselblad Corporation which has a removable back. More specifically, the camera is known as the Hasselblad 500C and is sold extensively throughout this country. Only those portions of the Hasselblad 500C camera which have a bearing on the present invention will be described herein. However, more information on this camera may be obtained from any neighborhood photography store.

Accordingly, the camera-accessory or back of the present invention is designated generally by the reference numeral 10 in the figures and includes an enclosed housing 12. The enclosed housing 12 includes a bottom portion 14 and a top portion 16 (FIG. 2). As shown in FIG. 6, the bottom portion 14 includes a stationary section 18 and movable section 21 which is hingedly connected to the section 18 by a hinge 22. The section 20 is releasably connected to the top portion 16 by any conventional lock mechanism, not shown. Thus, the section 20 may be rotated about the hinged connection 22 to allow the operator to gain access to the interior of the housing for inserting a pack of film thereinto or removing a pack of film therefrom. The bottom portion 14 further includes upstanding end walls 24 and 26, a front wall 28 and a rear wall 30. The top portion 16 includes depending end walls 32 and 34, a front wall 36 and a rear wall 38. The respective depending walls of the top portion are adapted to mate with the respective upstanding walls of the bottom portion when the movable section 20 is closed to form a light-tight enclosure. The top portion 16 further includes a top wall or plate 40 from which the walls 30, 32, 34 and 36 depend. The top plate 40 terminates at an upstanding wall 42. The wall 42 is spaced from the end 34 of the top portion and a plate 44 extends between the end wall 32 and the upstanding wall 42. A recess 46 is provided in the plate 44 and a slot is provided in the end wall 34 through which the film is adapted to exit. The recess 46 facilitates grasping the film.

The camera back 10 thus far described including the means within the housing 12 (not shown) for locating and positioning a Polaroid pack of film, but with the exception of the top wall 40 wherein the present invention resides, is offered for sale by the Polaroid Corporation of Cambridge, Mass., under their catalogue designation Polaroid Land Camera Back Model CB-100, Series 100 film pack adapter. Accordingly, if more information on this portion of the camera back is desired, the reader is referred to the aforementioned Polaroid Corporation.

In accordance with the present invention, as noted hereinabove, the top wall 40 is provided with means for mounting the camera back 10 on a Hasselblad camera Model No. 500C. Thus, the top wall 40 is provided with a substantially square through aperture 48 through which light is adapted to pass to expose the Polaroid film within the housing. Surrounding the aperture 48, in spaced relationship to the walls defining the aperture is a continuous recess 50. Spaced outwardly from the recess 50, in parallel relationship with respect to the recess 50, and extending about the periphery of the aperture 48, is a second recess 52. The recesses 50 and 52 are adapted to receive complementary shaped and positioned ribs which extend outwardly from the rear of the Hasselblad 500C camera to provide light traps or light blocking systems to prevent stray light from passing through the aperture 48.

As shown in FIG. 6, a U-shaped member designated generally by the reference numeral 54, which includes legs 56 and 58 and a bight portion 60 which connects the legs 56 and 58, is connected to the rear surface of the top wall 40 by any conventional means. The top edges of the legs 56 and 58 extend beyond the top edge of the aperture 48. Similarly, the bight portion 60 of the member 54 extends beyond or below the bottom edge of the aperture 48. The legs 56 and 58 and the portion of the bight 60 adjacent the lower edge of the aperture 48 are in spaced relationship to the rear surface of the top wall 40 to define a groove 61 therebetween. The upper and lower boundaries of this groove are defined by ribs 62 and 64 (FIG. 2) which extend rearwardly from the top wall 40. Slidably received within groove 61 is a dark slide 66 that is adapted to close the aperture 48 to prevent light from passing therethrough and exposing the film during handling, etc.

As shown in FIG. 3, the dark slide 66 includes a planar member 68 having a handle section 70. The handle portion extends beyond the side edges of the member 68. Additionally, the member 68 terminates in laterally spaced projecting ears or lugs 72 for reasons which will become apparent from a consideration of the description hereinbelow. Provided in the end wall 32 is a slot 74 (FIG. 4) through which the dark slide 66 is adapted to be received. Accordingly, when it is desired to prevent light from passing through the aperture 48, the dark slide 66 is inserted into the slot 74 in the end wall 32 of the camera back 10. Further inward movement of the slide causes the slide to be received in the groove 61 defined by rearwardly extending ribs 62 and 64 and the U-shaped member 54. The member 68 is sized so that it will extend beyond the left-hand edge of the aperture as taken in FIG. 1, to completely close the aperture 48. Additionally, the handle 70 extends beyond the edge of the slot 74 and is adapted to engage the sidewall 32 when the member 68 of the dark slide 66 closes the aperture 48 to limit further movement of the dark slide.

As shown in FIG. 1, a longitudinally extending strip 76 is connected to the rear surface of the top wall 40. The central portion of the strip 76 is spaced from the rear surface of the top wall to define a groove through which the dark slide 76 passes. Extending longitudinally in a recess in the strip 76, as shown in FIG. 4, is a resilient member 78, which may be made of sponge rubber or the like, about which a U-shaped flexible strip of plastic 80 extends. One leg of the U-shaped member 80 normally abuts the rear surface of the top wall 40. However, this leg is adapted to be displaced by the dark slide 66 when the slide 66 is inserted into the camera back 10. Accordingly, the members 78 and 80 form a light trap or light-blocking arrangement or system to prevent light from entering the interior of the housing 12 through the slot 74.

Additionally, as shown in FIG. 1, the top wall 40 is provided with an elongated recess 82 adjacent the edge of the recess 52. Moreover, an elongated aperture 84 is provided in the top wall 40; said aperture being transversely spaced from the recess 82. The recess 82 and the aperture 84 respectively accommodate the film winding gear and the counter release arm of the illustrative Hasselblad 500C camera. That is, the 500C camera described hereinabove includes a film winding gear which projects rearwardly from the back of the camera body. Additionally, the camera includes a counter release arm which similarly projects rearwardly from the back of the camera. The film winding gear is adapted to be received within the recess 82 and the counter release arm is adapted to be received through the aperture 84 when the camera accessory or back 10 is mounted on the camera.

As noted hereinabove, the dark slide 66 is provided with projecting ears 72. As shown in FIG. 1, the space between the ears 72 is such that when the dark slide 66 is in place, one ear 72 will close the aperture 84 while the other ear will be spaced beyond the top edge of the recess 82 and will lie in a plane encompassing recess 82. Since the ear 72 is spaced beyond the recess 82, it will be apparent that there will be no interference with the film winding gear of the camera when the dark slide is in place. Accordingly, it is specifically emphasized that the shutter of the camera may be wound albeit the dark slide is in place.

In order to prevent stray light from exposing the film in the picture area through the aperture 84, a light trap or light-blocking system designated generally by the reference numeral 86 in FIG. 4 is positioned inwardly of the aperture 84 between the aperture 84 and the aperture 48. The light trap 86 includes a transversely extending resilient member 88, which may be fabricated from sponge rubber or the like, and a flexible plastic strip 90 which is received between the resilient member 88 and the leg 58 of the U-shaped member 54 and extends upwardly therefrom into contact with the top wall 40.

When the dark slide 66 is inserted into the housing 12, it engages and depresses the strip 80 of the forward light-blocking system. Continued inward movement of the slide depresses the plastic strip 90. However, when the dark slide 66 is removed, the plastic members 80 and 90 again extend upwardly and contact the undersurface of the top wall 40 to prevent light from passing through the aperture 84 and the groove 61 defined by the leg 58 of the member 54 and the wall 40 or the slot 74 to eliminate the possibility of exposing film within the picture area of the housing 12.

It is emphasized that the dark slide may be inserted into the housing or enclosure 12 either right side up or upside down, as taken in FIG. 1, thereby eliminating fumbling for the correct position of the dark slide when it is to be inserted into the camera back. To be more specific, it is to be noted that the ears 72 are provided adjacent the upper edge and the lower edge of the dark slide, as shown in FIG. 3. Hence, in either of the aforementioned orientations of the dark slide, one of the ears 72 will close the aperture 84 when the dark slide is in place thereby increasing the ease of operation of the present device.

As shown in FIG. 5, the top wall 40 is provided with an inner longitudinally extending recess 92 which communicates with an upper recess 94. Received within the recess 94 and covering the opening of the recess 92 is an elongated metal plate 96, as shown in FIG. 1. The plate 96 has a dimension B which is smaller than the corresponding dimension A of the recess 94, so that the plate 96 is recessed with respect to the top wall 40. Additionally, the plate 96 is provided with two longitudinally spaced slots 98 which are superposed over a portion of the recess 92. The plate 98, in cooperation with a disengageable locking mechanism designated generally by the reference numeral 100, operate to secure the camera back 10 of the present invention to the Hasselblad 500C camera under consideration, in the manner noted below.

More specifically, the locking device 100 includes longitudinally spaced apertures 102 positioned adjacent the top edge of the top wall 40, slidably received within the top wall is a slide 104 having an outwardly extending projection 106 which extends beyond the rear wall 38 of the housing 12 through an appropriate elongated slot (not shown). Thus, the projection 106 is adapted to be engaged by the hand of the operator and moved to the left, as taken in FIG. 1 to cause the slide 104 to move toward the left. Defined in slide 104 are locking lugs 108 which are similarly adapted to be moved toward the left when the slide 104 is moved toward the left. Biasing means (not shown) biases the slide 104 toward the right. The locking lugs 108 are adapted to engage rearwardly extending projections on the camera to lock the camera to the back.

The Hasselblad camera under consideration includes two bottom rearwardly projecting feet, one of which is shown in FIG. 5 and designated 110; the camera back being illustrated schematically by the line 111. The leg 110 includes an upwardly turned portion 112 which is spaced a distance A' from the camera back 111. In practice, the dimension A' is equal to the dimension A and, therefore, is larger than the dimension B.

When it is desired to connect the camera to the back 10 of the present invention, the upwardly turned portions 112 of legs 110 of the camera are inserted through the respective slots 98. The camera is then pivoted so that the front surfaces of the portions 112 engage the plate 96. Since the dimension B is smaller than the dimension A' the camera easily pivots about the plate 96. That is, the fact that the plate is recessed facilitates pivoting of the camera. Further pivoting of the camera back causes the aforementioned projections to enter the apertures 102. Continued movement of the camera causes the rearwardly extending projections to engage the locking lugs 108 on the slide 104 and push the slide 104 to the left. After the camera is seated on the back, the slide 104 moves back to its normal position and the locking lugs 108 engage the complementary formed projections on the camera body to secure the camera to the camera back.

Due to the fact that the dimension A' is equal to the dimension A, the camera per se will tightly abut the back 10 thereby to ensure that no stray light paths will exist to cause premature exposure of the film.

When it is desired to release the camera back 10 from the camera body, the projection 106 is pushed toward the left thereby unlocking the device 100. The camera body may then be pivoted in the reverse direction to disengage the upturned portions 112 of the respective legs from the plate 96.

Accordingly a camera back has been described which may be utilized in conjunction with a conventional roll or pack film camera for converting the camera to one which is adapted to take Polaroid pictures.

FIG. 7 illustrates a modified embodiment of a dark slide arrangement which may be utilized to prevent unwanted light from entering the housing 12 through the aperture 84. Accordingly, an arm 114 which is pivotable about a connection 116 is provided which normally occupies the position shown in phantom line under the influence of a biasing spring (not shown) between the wall 40 and the arm 114. When the arm 114 is in this aforementioned position it prevents light from passing through the aperture 84 toward the film which is positioned toward the right in FIG. 7.

More specifically, there is provided in the housing 12, between the top wall 40 and the U-shaped member 54, a wall 85. The wall 85 is provided with an elongated through slot 87 through which a projection 89 on the arm 114 is adapted to extend when the arm is in the phantom line position shown. The arm 114 is substantially greater in height than the height of the slot 87 so that the arm seals the slot 87 when the arm is in the phantom line position to prevent the passage of light therethrough. The arm 114 is sized to open the aperture 84 when the arm is in the light-blocking position so that the arm will not interfere with the operation of the attached camera.

In the embodiment of FIG. 7, a dark slide 166 is provided which terminates in a straight edge. When the dark slide is inserted into the back, the straight edge engages the projection 89 to move the arm to the solid line position wherein the arm encloses the aperture 84 to prevent the passage of light therethrough. When the dark slide 166 is removed, it will be obvious that the arm 114 again will assume the phantom line position.

While preferred embodiments of the invention have been shown and described herein it will become obvious that numerous omissions, changes and additions may be made in such embodiments without departing from the spirit and scope of the present invention.

What I claim is:

1. An accessory camera back of the type having means for receiving Polaroid film to convert a conventional film-type camera having a removable back to a camera adapted to take Polaroid film comprising an enclosing housing having a top portion including a top wall and a bottom portion hingedly connected to said top portion, said bottom portion normally being connected with said top portion in light-tight engagement therewith and being adapted to be rotated about said hinged connection to permit access to the interior of said housing to insert film therein or remove film therefrom, a through light aperture in said top wall through which light may pass to expose the film within the housing, a removable dark slide slidably received within said housing and movable to an aperture-closing position to prevent the passage of light through said aperture, a plurality of projection-receiving openings in said top wall for receiving therethrough complementary formed projections mounted on a camera body, and locking means on said top wall for engaging the camera projections to prevent the release of the same, an elongated aperture in said top wall adjacent to said light aperture positioned to receive a projection from a camera, closing means on said dark slide positioned to effect the closure of said elongated aperture when said dark slide is in the aperture-closing position, and light trap means positioned between said elongated and light apertures for preventing stray light from exposing film received in said housing.

2. An accessory camera back as in claim 1, and a plurality of continuous recesses in spaced relationship to the edges defining said light aperture adapted to engage complementary formed projecting ribs on a camera back to provide a plurality of light traps.

3. An accessory camera back as in claim 1, in which said closing means includes at least two spaced ears whereby said dark slide may be inserted into said camera in at least two different orientations so that any one of said ears is operable to close said elongated aperture.

4. An accessory camera back as in claim 1, in which said light trap includes an arm movable from an elongated aperture open to an elongated aperture closed position by said closing means, a wall in said housing, a slot in said wall, a projection on said arm extending through said slot and being engageable by said closing means when said arm is in said elongated aperture open position to effect movement of said arm to the elongated aperture closed position when said dark slide is moved to the aperture closed position, said arm being sized to close said slot when said arm is in the elongated aperture open position.

5. An accessory back of the type having means for receiving Polaroid film to convert a conventional film-type camera having a removable back to a camera adapted to take Polaroid film comprising an enclosed housing having a top portion including a top wall and a bottom portion hingedly connected to said top portion, said bottom portion normally being connected with said top portion in light-tight engagement therewith and being adapted to be rotated about said hinged connection to permit access to the interior of said housing to insert film therein or remove film therefrom, a through light aperture in said top wall through which light may pass to expose the film within the housing, a removable dark slide slidably received within said housing and movable to an aperture-closing position to prevent the passage of light through said light aperture, and locking means on said top wall for engaging complementary formed projections mounted on a camera body to prevent the release of the same, said locking means including a recessed plate in said top wall, and at least two openings in said plate adapted to receive the projecting lugs from a camera therethrough and to engage said lugs to prevent their release from said openings.

6. An accessory camera back as in claim 5, in which said locking means further includes at least two lug-receiving apertures in said top wall, displaceable lug engaging members in each lug-receiving aperture adapted to be displaced when projecting complementary formed lugs from a camera are received therethrough and to engage said lugs when positioned through said lug-receiving apertures to lock the camera on said back.